US007467505B2

(12) United States Patent
MacGregor

(10) Patent No.: US 7,467,505 B2
(45) Date of Patent: Dec. 23, 2008

(54) CROP HARVESTING HEADER WITH DRIVE REVERSAL

(75) Inventor: Don MacGregor, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 495 days.

(21) Appl. No.: 11/259,352

(22) Filed: Oct. 27, 2005

(65) Prior Publication Data
US 2007/0089391 A1 Apr. 26, 2007

(30) Foreign Application Priority Data
Oct. 25, 2005 (CA) .................................. 2522387

(51) Int. Cl.
*A01D 69/00* (2006.01)
(52) U.S. Cl. ....................................................... 56/11.9
(58) Field of Classification Search .................. 60/445; 56/11.2, 11.9, 10.2 H, 10.2 J, 10.9; 460/16; 91/487, 486, 492, 491
See application file for complete search history.

(56) References Cited

U.S. PATENT DOCUMENTS

| 4,663,919 A * | 5/1987 | Stroh et al. ................... 56/11.2 |
| 5,462,486 A * | 10/1995 | Norton .......................... 460/20 |
| 5,527,218 A * | 6/1996 | Van den Bossche et al. ... 460/20 |
| 5,791,128 A * | 8/1998 | Rogalsky ....................... 56/14.5 |
| 5,996,324 A * | 12/1999 | Oligmueller ................. 56/11.2 |
| 6,247,296 B1 * | 6/2001 | Becker et al. ................. 56/11.2 |
| 6,430,905 B2 * | 8/2002 | Eis et al. ........................ 56/11.2 |
| 6,722,112 B2 * | 4/2004 | Pierce et al. .................. 56/11.2 |
| 6,895,734 B2 * | 5/2005 | Ameye ........................ 56/10.8 |
| 7,052,423 B2 * | 5/2006 | Jonckheere et al. .......... 474/148 |
| 2001/0022070 A1* | 9/2001 | Eis et al. ....................... 56/10.9 |
| 2003/0159416 A1* | 8/2003 | Pierce et al. .............. 56/10.2 J |

* cited by examiner

*Primary Examiner*—Árpaád Fábián-Kovács
(74) *Attorney, Agent, or Firm*—Adrian D. Battison; Ade & Company Inc.

(57) ABSTRACT

A crop harvesting machine including a header mounted on a tractor is hydraulically driven by a pair of pumps on the tractor and a series of motors on the header. A first circuit control includes variable rate valves controlling the rate of supply of fluid from the unidirectional pumps to the motors to vary rate of the knife, conditioner, reel and converging systems in a forward harvesting direction. A second circuit controls reverse rotation of at least some of the elements for releasing a blockage by taking the fluid from one of the pumps and passing it through the separate second circuit to the required motors in series. The second circuit is provided in a separate block which can be omitted and thus constitutes an option. The drive of the motors in reverse direction in series ensures that they are driven at common speed without need from individual speed control. The use of unidirectional pumps and the separate circuits for forward and reverse allows the use of a single return and a filter at the return which is advantageous in a system which allows disconnection of couplings to allow the header to be replaced.

12 Claims, 6 Drawing Sheets

CROP HARVESTING HEADER WITH DRIVE REVERSAL

This invention relates to a crop harvesting header and particularly to a drive system for the components of the header by which the direction of drive of at least some of the components can be reversed.

BACKGROUND OF THE INVENTION

MacDon, the Assignee of the present application, manufactures a tractor which is used to transport headers of different types across the ground for cutting a standing crop.

Headers can be of various different types including headers known as "draper headers" in which there is provided a sickle knife across the front edge of the header which cuts the standing crop and a pair of conveyor belts or drapers behind the knife onto which the crop falls for transporting the crop transversely across the header to a discharge opening at a suitable location on the header. A reel is generally provided which rotates around an axis parallel to the knife above the knife and provides a series of bats which rotate and carry the cut crop over the knife and onto the conveyor belts.

Commonly at the discharge opening there is provided a crop conditioner into which the crop material from the discharge opening passes for conditioning of the crop to assist in drying.

It is necessary on a header of this type to drive the knife, the reel, the conveyor belts and the conditioner. Generally these elements each include a separate hydraulic drive motor.

On the tractor is provided a power source which drives generally two pumps which generate pressurized flow of hydraulic fluid which is fed to the motors to drive the motors at a required speed. The tractor includes control elements which allow control of the hydraulic fluid flow to control the speed of the elements as required under the actuation of the operator who has suitable control systems for controlling the speed of the various elements.

Tractors of this type are generally manufactured in a manner which will allow the header to be removed and replaced by an alternative form of header with the hydraulic connections from the control systems of the tractor to the various motors on the header including quick release couplings so that the header can be quickly disconnected mechanically and hydraulically.

Alternative forms of header which can be used on a tractor of this type include the auger header in which the conveying system of the drapers of the draper header are replaced by the conventional auger flight tube which is located behind the table and includes auger flight elements which carry the crop material inwardly toward a central discharge opening. In this header, therefore the auger must be driven a suitable drive motor in replacement for the drive of the drapers on the previous type of header.

Other types of header can also be used on a tractor of this type including a rotary cutter which includes a series of cutting discs at spaced positions across the width of the header with each disc carrying a pair of blades which rotate generally around a vertical axis of a disc. The discs thus carry the crop material which is cut inwardly to a discharge opening where the material exits into the conditioner. A header of this type requires therefore the driving of the discs and also the driving of the conditioner.

Hydraulic circuits for a tractor of this type therefore must accommodate the different types of header and provide the necessary motive power in the hydraulic fluid couplings to drive the motors of the header.

In recent years it has become common that the drive system for the header be arranged in such a way that the components can be driven in reverse in the event of a blockage or other problem which requires the crop material to be removed from the system. Thus it is necessary to drive the conditioner in reverse to drive any collected crop blockage back into the header. At the same time it is necessary to reverse the discs of a disc cutter and the auger of an auger header so that the crop material is carried back toward the front. It is common also to reverse the direction of the drive of the reel to again assist in moving the crop material to the front for discharge. The knife and the drapers can also be driven in reverse if this is convenient for the hydraulic circuit but of course reversing these elements has little effect on the operation.

The conventional technique for reversing the drive system in an arrangement of this type involves providing pumps which are bi-directional. Thus in a simple closed circuit, the pump of the tractor has its inlet and outlet directly connected to a corresponding port on the pump so that driving of the pump in the forward direction drives the motor in a forward direction and correspondingly driving of the pump in the reverse direction of fluid flow drives the motor in the reverse direction.

This arrangement is of course very simple but it has a number of disadvantages.

Firstly it requires the provision of bi-directional pumps which adds to the complexity of the system. It is difficult therefore in a manufacturing system to manufacture a tractor which has the option to omit the reversing system since all tractors will be manufactured with the bi-directional pumps regardless of the whether reversing option is selected or not.

Secondly, the bi-directional pumps require two directional flow in the circuit so that it is not possible to provide the conventional drain and filter system to reduce fluid contamination. This is particularly problematic in a system where quick couplers are used since contamination is more likely leading to possible damage to the system.

The problems with this type of drive for a windrower tractor that is designed to quick disconnect from the header implement, therefore, are:

The possibility of contamination where typically these types of machines run the oil in a closed loop with a makeup supercharge pump providing makeup (clean) oil. They also add shuttle valves to increase the makeup flow on the return side; however, typically this would only exchange 10% of the oil in order to have the contamination extracted from it. If the machine has quick couplers on it, chances of introducing contamination is high.

The requirement for positive shutoff where header shutoff on this type of machine needs to be positive to ensure there is no creep in the drive. This can be difficult to achieve consistently with a dual direction piston pump.

The limitations of reversing circuitry, since the dual direction pump is a closed loop pump, the reversing circuitry is limited to the drive system that it drives forward. This is typically not a problem on most auger header and disc mowers, as this is the normal drive system, but on draper headers and the auger header, auxiliary functions require variable speed controls which typically require a secondary pump to achieve. Reversing these components along with the main cutting/conditioning drive becomes a major challenge.

Reversing complexity is built into a standard drive arrangement rather than as an option. Dual direction pumps basically have all components necessary to reverse drives in the base design. Because of this, it builds more cost into the base unit which does not require or want drive reverse. On the standard draper header without conditioner drive reversing is not required.

SUMMARY OF THE INVENTION

It is one object of the invention to provide an improved crop harvesting machine which includes a hydraulic circuit controlling operation of the motors for driving the various elements of the machine.

According to one aspect of the invention there is provided a crop harvesting machine comprising:

a header;

a tractor having a power unit;

a crop cutting and transfer system on the header for cutting a standing crop and transferring the standing crop after cutting to a discharge opening of the header;

the crop cutting and transfer system including at least one hydraulic motor for driving the crop cutting and transfer system;

a crop conditioner system at the discharge opening for conditioning the cut crop from the discharge;

the crop conditioner system having a hydraulic motor for driving the crop conditioner system;

at least one hydraulic pump driven by the power unit on the tractor having a pump input for generating pressurized flow in hydraulic fluid at a pump output for driving the motor of the cutting system and for driving the motor of the conditioner system;

a first circuit arranged for supplying the hydraulic fluid from the at least one pump to the motor of the crop cutting system and the motor of the crop conditioner system for driving both motors in a forward direction for crop harvesting;

the first circuit including a first variable rate valve for controlling a rate of flow of fluid to the at least one motor of the cutting system for controlling the speed thereof and a second variable rate valve for controlling a rate of flow of fluid to the motor of the conditioner system for controlling the speed thereof;

the first circuit including a return drain and filter for return of fluid to the at least one pump after driving the motor of the cutting system and the motor of the cutting system;

and a second circuit including a reverse control valve for supplying, with flow of fluid through the first and second variable rate valves halted, the hydraulic fluid from the at least one pump to the at least one motor of the crop cutting system and the motor of the crop conditioner system for driving the motors in a reverse direction for releasing a crop blockage.

Preferably the crop cutting system includes a knife and a reel located over the knife and there is provided a hydraulic motor for driving the reel wherein the first variable rate valve varies the flow rate to the reel and the second circuit is arranged to drive the reel in the reverse direction.

Preferably the crop cutting system includes a crop conveying system for conveying cut crop from the cutting system to a discharge and there is provided a hydraulic motor for driving the crop conveying system wherein there is provided a variable rate valve which varies the flow rate to the crop conveying system and the second circuit is arranged to drive the crop conveying system in the reverse direction.

Preferably the second circuit is arranged to drive the motors at a constant rate.

Preferably the second circuit is arranged to drive the motors in series.

Preferably the at least one pump includes a first pump and a second pump and the first circuit provides separate channels for supplying fluid from the first pump and the second pump to respective ones of the motors.

Preferably the second circuit is arranged to drive the motors in reverse direction from one only of the pumps.

Preferably the first circuit is arranged such that the said at least one of the pumps provides fluid to drive at least two of the motors in series.

Preferably the first circuit is arranged such that the first variable rate valve controls a rate of flow of fluid to one motor which is arranged in series with a second motor and the second variable rate valve is arranged to supply additional fluid to the second motor.

Preferably the first circuit is defined in at least one first circuit block and the second circuit is arranged separate from the first circuit in a separate block which can be removed separately from the first circuit such that the first circuit can be operated in the absence of the further block for driving only in the forward direction.

Preferably the separate block includes a return conduit which supplies to the return drain of the first circuit.

Preferably the first and second circuits are arranged to provide coupling ports for releasable connection to the header for replacement of the header.

According to a second aspect of the invention there is provided a crop harvesting machine comprising:

a header;

a tractor having a power unit;

a crop cutting and transfer system on the header for cutting a standing crop and transferring the standing crop after cutting to a discharge opening of the header;

the crop cutting and transfer system including at least one hydraulic motor for driving the crop cutting and transfer system;

a crop conditioner system at the discharge opening for conditioning the cut crop from the discharge;

the crop conditioner system having a hydraulic motor for driving the crop conditioner system;

at least one hydraulic pump driven by the power unit on the tractor having a pump input for generating pressurized flow in hydraulic fluid at a pump output for driving the motor of the cutting system and for driving the motor of the conditioner system;

a hydraulic circuit arranged for supplying the hydraulic fluid from the at least one pump to the motor of the crop cutting system and the motor of the crop conditioner system for driving both motors in a forward direction for crop harvesting;

the hydraulic circuit including a first variable rate valve for controlling a rate of flow of fluid to the at least one motor of the cutting system for controlling the speed thereof and a second variable rate valve for controlling a rate of flow of fluid to the motor of the conditioner system for controlling the speed thereof;

the hydraulic circuit including a reverse control valve for supplying, with flow of fluid through the first and second variable rate valves halted, the hydraulic fluid from the at least one pump to the at least one motor of the crop cutting system and the motor of the crop conditioner system for driving the motors in a reverse direction for releasing a crop blockage;

wherein the hydraulic circuit and the reverse control valve are arranged to drive the motors in the reverse direction in series at a common speed.

According to a third aspect of the invention there is provided a crop harvesting machine comprising:

a header;

a tractor having a power unit;

a crop cutting and transfer system on the header for cutting a standing crop and transferring the standing crop after cutting to a discharge opening of the header;

the crop cutting and transfer system including at least one hydraulic motor for driving the crop cutting and transfer system;

a crop conditioner system at the discharge opening for conditioning the cut crop from the discharge;

the crop conditioner system having a hydraulic motor for driving the crop conditioner system;

at least one hydraulic pump driven by the power unit on the tractor having a pump input for generating pressurized flow in hydraulic fluid at a pump output for driving the motor of the cutting system and for driving the motor of the conditioner system;

a first circuit arranged for supplying the hydraulic fluid from the at least one pump to the motor of the crop cutting system and the motor of the crop conditioner system for driving both motors in a forward direction for crop harvesting;

and a second circuit including a reverse control valve for supplying, with flow of fluid through the first circuit halted, the hydraulic fluid from the at least one pump to the at least one motor of the crop cutting system and the motor of the crop conditioner system for driving the motors in a reverse direction for releasing a crop blockage;

wherein the first circuit is defined in at least one first circuit block and the second circuit is arranged separate from the first circuit in a separate block which can be removed separately from the first circuit such that the first circuit can be operated in the absence of the further block for driving only in the forward direction.

According to a fourth aspect of the invention there is provided a crop harvesting machine comprising:

a header;

a tractor having a power unit;

a crop cutting and transfer system on the header for cutting a standing crop and transferring the standing crop after cutting to a discharge opening of the header;

the crop cutting and transfer system including at least one hydraulic motor for driving the crop cutting and transfer system;

a crop conditioner system at the discharge opening for conditioning the cut crop from the discharge;

the crop conditioner system having a hydraulic motor for driving the crop conditioner system;

at least one hydraulic pump driven by the power unit on the tractor having a pump input for generating pressurized flow in hydraulic fluid at a pump output for driving the at least one motor of the cutting system and for driving the motor of the conditioner system;

a hydraulic circuit arranged for supplying the hydraulic fluid from the at least one pump to the motors for driving the motors in a forward direction for crop harvesting;

the hydraulic circuit including a first variable rate valve for controlling a rate of flow of fluid to a first motor for controlling the speed thereof and a second variable rate valve for controlling a rate of flow of fluid to a second motor for controlling the speed thereof;

wherein the hydraulic circuit is arranged such that the said at least one of the pumps provides fluid to drive the first and second motors in series;

and wherein the hydraulic circuit is arranged such that the first variable rate valve controls a rate of flow of fluid to the first motor which is arranged in series with the second motor and the second variable rate valve is arranged to supply additional fluid to the second motor.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
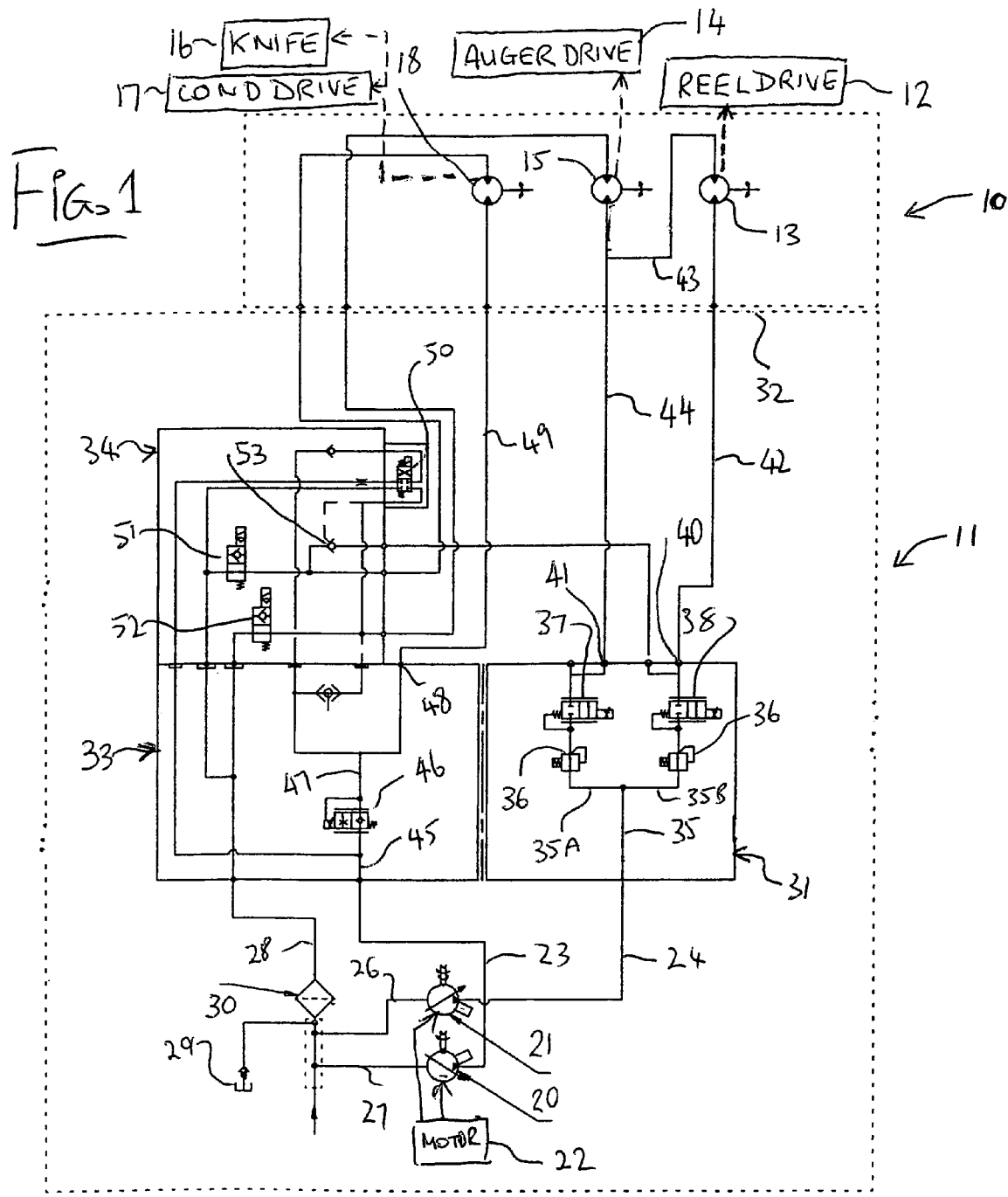
FIG. 1 is a schematic illustration of a hydraulic circuit for driving an auger header.

In FIG. 1 is shown the circuit for the crop harvesting machine which includes a header 10 and components mounted on a tractor 11. The construction of the tractor and header itself are not shown since these are well known to one skilled in the art and can vary in construction in accordance with well known parameters. It is suffice to say that the header includes a reel 12 driven by a reel motor 13, an auger 14 driven by an auger motor 15, a knife 16 and a conditioner 17 both driven by a drive motor 18.

The tractor 11 includes a first drive pump 20 and a second drive pump 21 each of which receives driving force from a motor 22 of the tractor. The pumps 20 and 21 are of the unidirectional type so that they provide pressurized flow only at an output side, receiving fluid at an inlet side from a drain line. The pump 20 thus has an output line 23 at which pressurized fluid is supplied and a pump 21 is an output line 24 for the pressurized fluid. Each of the pumps has a return line 26 and 27 receiving fluid from a return line 28 including a tank 29 and a filter 30. Thus the fluid generated in the circuit passes only in one direction and always returns through the filter 30 so that the filter is also unidirectional and can accommodate the high pressures involved in the single direction in the filtering action to extract all contaminants before the fluid is returned to the pumps for further pressurization.

The tractor further carries a first block 31 of the circuit which includes a series of components mounted on the block for connection to the interface 32 between the components on the tractor 11 and the components on the header. The interface is shown simply as the interconnection between two block elements but it will be appreciated that these include quick connect couplings well known to a person skilled in the art so that the circuit paths from the components on the header can be directly connected to the circuit paths on the components on the tractor quickly and easily for ready replacement of the header when required.

Figure 3:
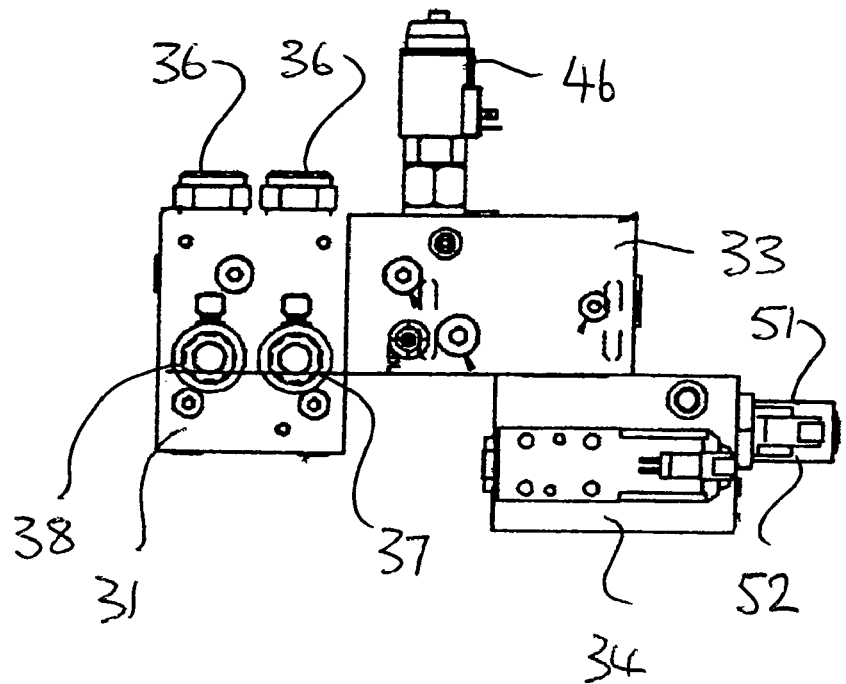
FIG. 3 is a top plan view of the circuit blocks containing the circuit of FIG. 1.
Figure 4:
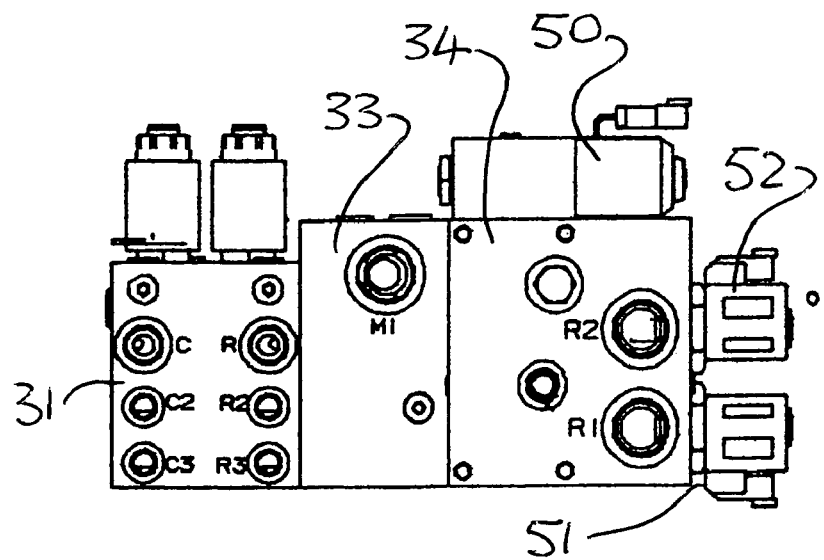
FIG. 4 is a front elevational view of the blocks of FIG. 3.
Figure 5:
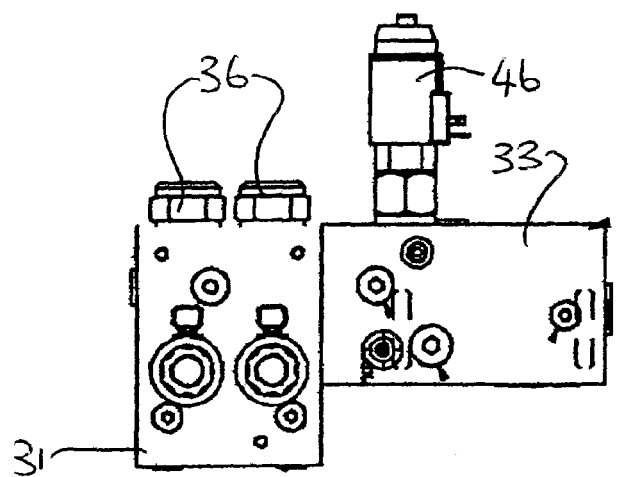
FIG. 5 is a top plan view of the circuit blocks of the circuit of FIG. 2.
Figure 6:
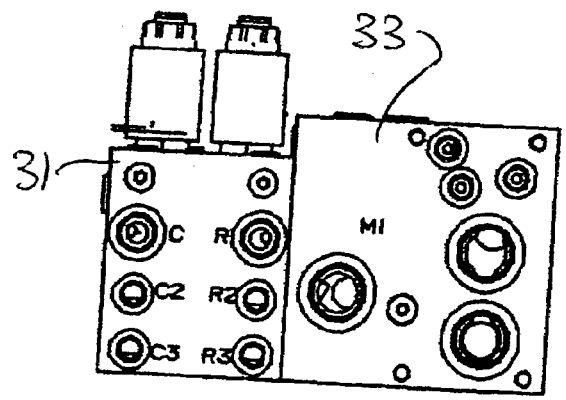
FIG. 6 is a front elevational view of the blocks of FIG. 5.

The tractor further carries a second block 33 which includes further components of the circuit. A yet further block 34 is provided which contains the reversing components of the circuit. These elements are shown in FIGS. 3 and 4 in their physical construction and it will be noted that the blocks are physically connected each to the next by "sandwich" mount arrangements in which each block is simply bolted to the next to provide connection to the ports in the surfaces of the blocks.

The components shown in FIG. 1 include only the circuit paths for the fluid flow and do not include conventional case drain lines which are conventionally used in mounting blocks of this type so as to drain any collecting fluid back to the tank for recirculation. In additional the circuit does not show the control functions by which the output pressure of the pump is controlled in dependence upon pressure levels or pressure drops at certain positions within the circuit so as to maintain required operating pressure. The arrangement of the control circuit elements and the drain circuit elements are well known to a person skilled in this art and therefore are not shown nor described in the present application. The present application is primarily concerned with the arrangement of the circuit paths which are described in detail hereinafter.

The block 31 is connected to the output line 24 of the pump 21 so that fluid from the pressure pump 21 is supplied into the block 31 at an input line 35. The input line 35 splits into two lines 35A and 35B. Each of these lines contains a respective pressure compensator 36 of a conventional nature which is used in conjunction with the control lines mentioned above to maintain the required pressure in the lines 35A and 35B. Flow in these lines is controlled by a pair of variable rate valves 37 and 38 which control the rate of flow of fluid to the output ports of the block 31. These valves 37 and 38 are controlled by the operator through the electrical control system so as to vary the rate of flow as required. The valves are operated independently in accordance with requirements to provide the necessary flow rate as determined by the operator and the operating system. The valves are of the type generally known as PWM valves or pulse width modulation valves which are a particular type of valve for controlling the flow rate depending upon pulses supplied by the control system. The details of these devices are well known to one skilled in the art and therefore will not be described herein.

The output from the valve 38 is supplied to an outlet port 40 of the block 31. The outlet from the valve 37 is supplied to an outlet port 41 of the block 31. The circuit further includes a line 42 which communicates from the output port 40 to the connector at the interface 32 so as to supply fluid from the valves 38 to the reel drive motor 13. Thus the reel drive motor 13 drives the reel at a speed determined by the valve 38. The motor 15 of the auger is connected in series with the motor 13 so that an output line 43 carries the fluid from the outlet side of the motor 13 to the inlet side of the motor 15. Thus the motor 15 is driven at a rate which is partly determined by the rate of flow in the line 42 and therefore the rate of flow through the motor 13. However the flow into the inlet of the motor 15 is supplemented by flow from the port 41 through a line 44 and the interface 32.

In this way the speed of the auger can be varied relative to the speed of the reel by varying the valve 37. In this way the speed of the reel and the speed of the auger are partly tied together so that they can be controlled simultaneously by the valve 38. However the differential between the speed of the reel and the speed of the auger can be controlled by supplementing the flow to the auger motor 15 through the line 44 as controlled by the valve 37.

The pump 20 supplies fluid to the output line 23 which is carried to the inlet line 45 of the block 33. A further variable valve 46 is provided in the line 45 which can vary the output onto a line 47 which communicates through a port 48 of the block 33 and a line 49 through the interface 32 to the inlet of the motor 18. Thus the motor 18 is driven at a rate controlled by the valve 46 by fluid supplied by the pump 20.

The reverser block 34 incldues reverser valves 50, 51 and 52. These control the supply of fluid in the reverse direction as described hereinafter. Furthermore the block includes a pilot operated back check valve 53 which also acts in the control system as described hereinafter.

In general, when the flow through the valves 37, 38 and 46 is closed off, flow passes in the reverse direction through the reverser block and supplies each of the motors, 18, 15 and 13 in series in reverse to drive the elements in reverse.

Figure 2:
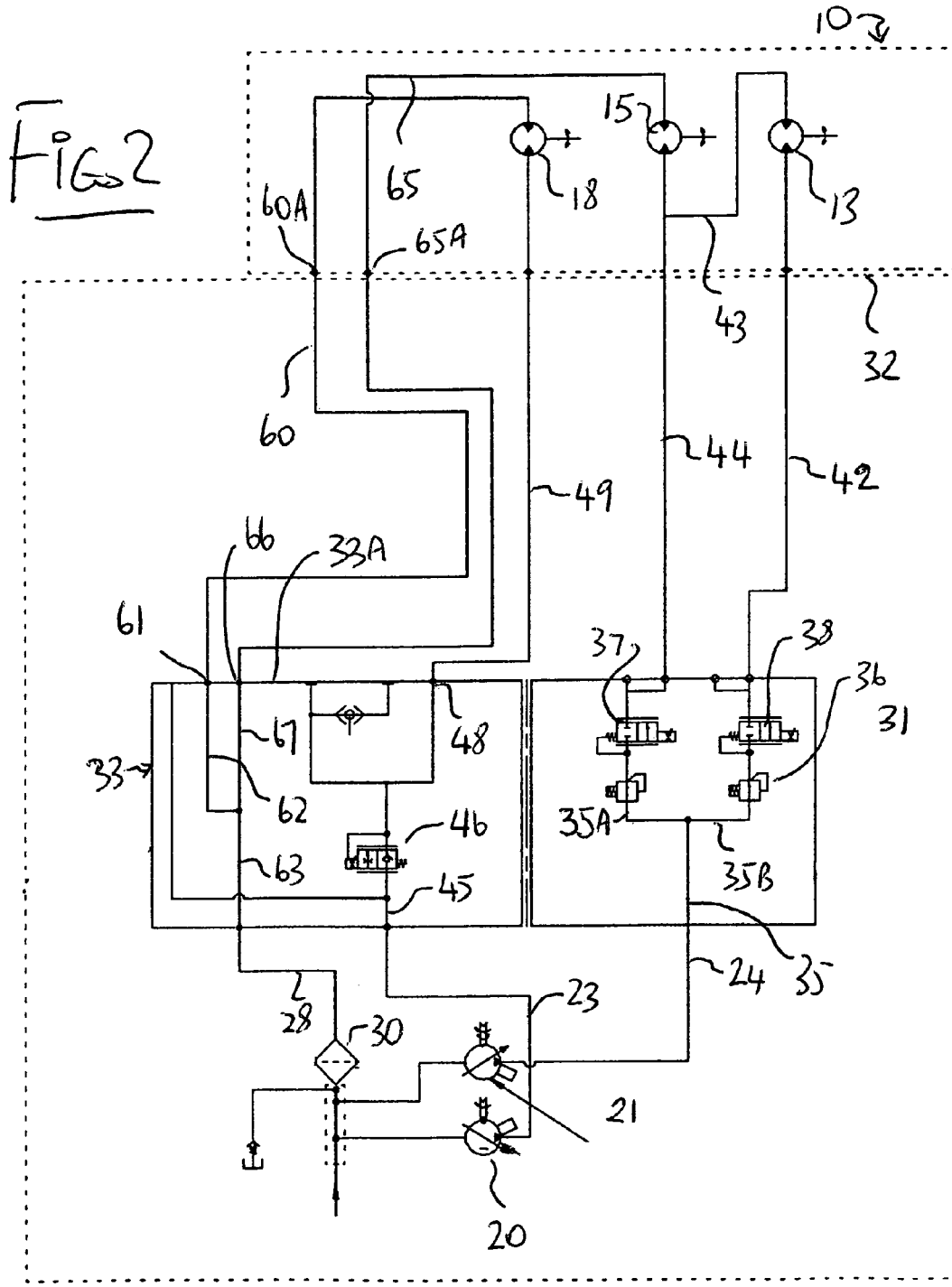
FIG. 2 is a schematic illustration similar to that of FIG. 1 showing the hydraulic circuit with the reverser option omitted.

In FIG. 2 is shown the arrangement of FIG. 1 including the components mounted on the header 10 and the components mounted on the tractor 11. The components include the block 31 which communicates at the interface 32 with the components on the header. The block 34 is omitted so that the block 33 communicates through an interface 33A directly with the components on the header at the interface 32.

In this simplified form of the circuit with the reverser omitted, it is clear that the pump 20 communicates fluid under pressure through line 23 to the line 45 and through the valve 46 to the port 48 and the line 49 which drives the motor 18 with the fluid from the motor 18 returning through a line 60 to a port 61 at the interface 33A and from the port 61 through a line 62 and a line 63 to the line 28 and the filter 30.

The fluid from the pump 21 is communicated at a line 24 and splits into the lines 35A and 35B at the line 35 from which it passes through the compensators 36 and the control valves 37 and 38 respectively. From the control valves the fluid passes through the line 42 to the motor 13 and from the motor 13 to the motor 14. Additional fluid from the line 44 can be added at the junction with a line 43 to control the speed of the motor 14 relative the motor 13. From the motor 14 the fluid returns through the line 65 through the port 65A along side the port 60A of the line 60. From the line 65 the fluid enters the port 66 and the line 67 where it joins with the fluid from the line 62 into line 63 and the line 28 returning to the filter 30.

This circuit is therefore relatively straightforward and acts to drive using the pumps 20 and 21 the motors 13, 15 and 18 in forward direction at an individually controllable rate.

Figure 7:
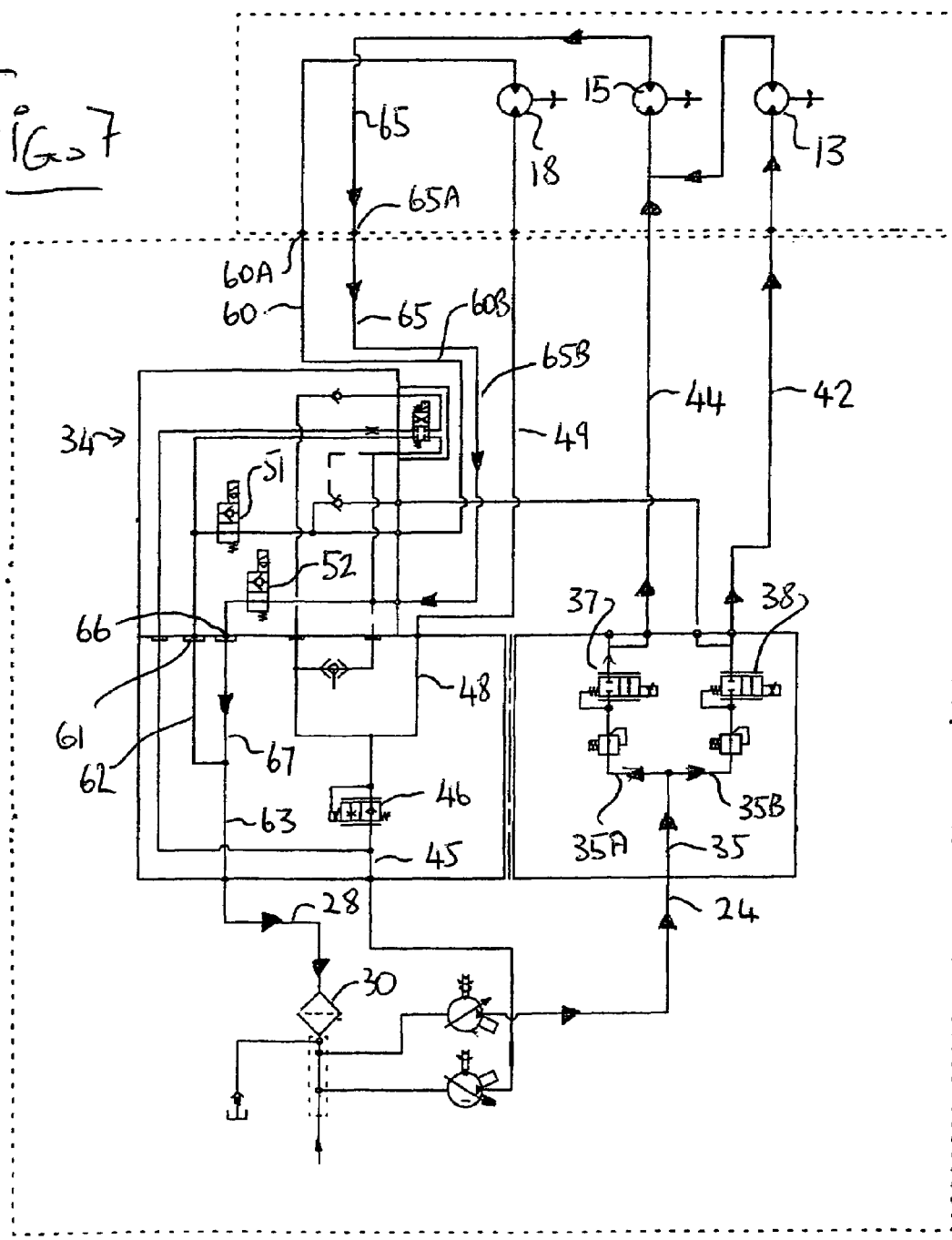
FIG. 7 is the same figure as FIG. 1 in which the flow of fluid in the forward direction is illustrated.

Turning now to FIG. 7 this shows the arrangement of FIG. 1 including the reverser block 34. In the forward direction of operation as shown in FIG. 7, the operation is substantially identical to that of FIG. 2 with the exception that the lines 60 and 65 are communicated through the block 34. Thus the line 65 includes a portion 65B which communicates from the port 65A to the valve 52 which is not energized. Thus fluid form the line 65B passes through the valve 52 to the port 66 where it continues on the same path as in FIG. 2 to the filter 30.

Similarly the line 60 includes a portion 60B which passes through the block 34 to the valve 51 which is also not energized so that the fluid on the line 60B passes through the valve 51 to the port 61 and symmetrically through the same lines as in FIG. 2 to the filter 30.

Figure 8:
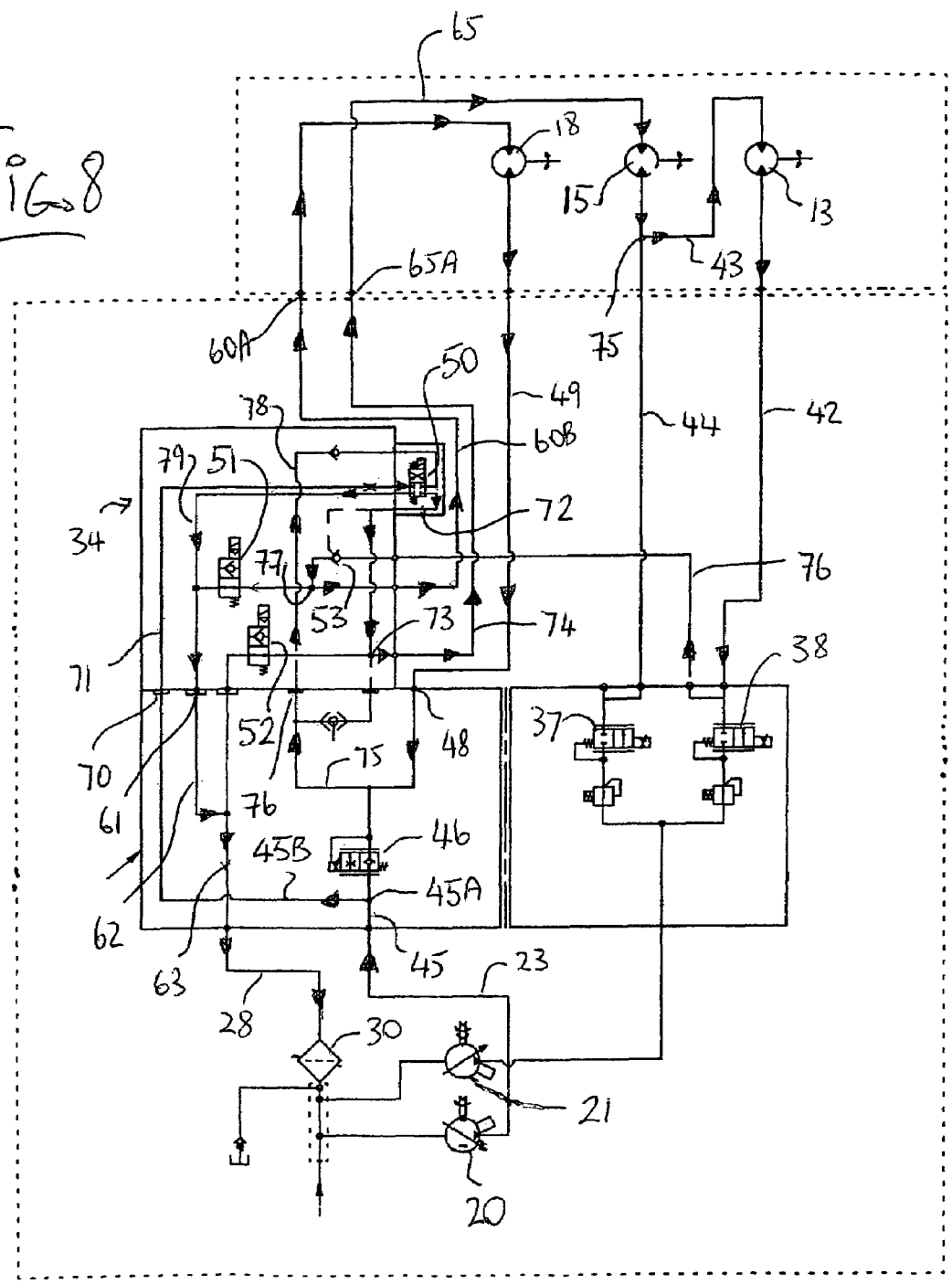
FIG. 8 is the same figure as FIGS. 1 and 7 showing the fluid flow in the reverse direction.

Turning now to FIG. 8, this shows the operation of the circuit in the reverse direction. In the reverse direction the pump 21 is deactivated and the control valves 37, 38 and 46 are deactivated so that fluid is prevented from flowing from the pump 21 through the valves 37 and 38 and fluid is prevented from flowing from the pump 20 through the valve 46. In the reverse operation the valves 50, 51 and 52 are energized and also the pilot valve 53 is activated by application of pressure to the control side of the pilot valve 53.

With the valves arranged in this energized condition, therefore, fluid from the pump 20 is communicated through the line 23 and the line 45 to a junction 45A. Since the valve 46 is closed, the fluid is directed along a line 45B to a port 70. At the port 70, the fluid enters the block 34 into a line 71 which communicates the fluid to the reverse control valve 50 which in an energized condition. From the line 71 the fluid emerges from the valve 50 onto a line 72. The line 72 communicates to a junction 73 at which the fluid is prevented from passing through the valve 52 since the valve is energized and thus the fluid at the junction 73 enters onto a line 74 which communicates to the port 65A. Thus the line 74 is in effect the same as the line 65 but used in reverse so that the fluid passes in reverse direction along the line 74 to the port 65A and from the port 65A through the line 65 to the reverse side of the motor 15. From the motor 15, the fluid passes to a junction 75 but the fluid is prevented from passing along the line 44 since the valve 37 is closed. Instead therefore the fluid must pass along the line 43 to the motor 13, the fluid passes along the line 42. However since the valve 38 is closed, the fluid passes into a line 76 where it reaches the pilot valve 53 which is opened by supply pressure to the pilot valve causing the return fluid to pass along the line 76 and through the valve 53 to a junction 77. The fluid at the junction 77 is prevented from passing through the valve 51 which is energized and thus closed. Thus the fluid at the junction 77 passes into the line 60B running in the reverse direction and passes from the line 60B to the port 60A. From the port 60A the fluid passes in reverse direction to the motor 18. From the motor 18 the fluid passes through the line 49 to the port 48. From the port 48 the fluid passes along a line 75 to a port 76. From the port 76 the fluid passes along a line 78 through the valve 50 to a line 79 to the port 61 and through the lines 62 and 63 and the line 28 to the filter 30.

Thus in the reverse operation of FIG. 8, in general the pump 20 acts to drive each of the motors 15, 13 and 18 in series in the reverse direction at a common speed with the flows being controlled by the de-energization of the valves 37, 38 and 46 and by the energizing of the valves 50, 51 and 52.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting machine comprising:
a header;
a tractor having a power unit;
a crop cutting and transfer system on the header for cutting a standing crop and transferring the standing crop after cutting to a discharge opening of the header;
the crop cutting and transfer system including at least one hydraulic motor for driving the crop cutting and transfer system;
a crop conditioner system at the discharge opening for conditioning the cut crop from the discharge;
the crop conditioner system having a hydraulic motor for driving the crop conditioner system;
at least one hydraulic pump driven by the power unit on the tractor having a pump input for generating pressurized flow in hydraulic fluid at a pump output for driving the motor of the cutting system and for driving the motor of the conditioner system;
a first circuit arranged for supplying the hydraulic fluid from the at least one pump to the motor of the crop cutting system and the motor of the crop conditioner system for driving both motors in a forward direction for crop harvesting;
the first circuit including a first variable rate valve for controlling a rate of flow of fluid to the at least one motor of the cutting system for controlling the speed thereof and a second variable rate valve for controlling a rate of flow of fluid to the motor of the conditioner system for controlling the speed thereof;
the first circuit including a return drain and filter for return of fluid to the at least one pump after driving the motor of the cutting system and the motor of the conditioner system;
and a second circuit including a reverse control valve for supplying, with flow of fluid through the first and second variable rate valves halted, the hydraulic fluid from the at least one pump to the at least one motor of the crop cutting system and the motor of the crop conditioner system for driving the motors in a reverse direction for releasing a crop blockage.

2. The machine according to claim 1 wherein the crop cutting system includes a knife and a reel located over the knife and there is provided a hydraulic motor for driving the reel and wherein the first variable rate valve varies the flow rate to the reel and wherein the second circuit is arranged to drive the reel in the reverse direction.

3. The machine according to claim 1 wherein the crop cutting system includes a crop conveying system for conveying cut crop from the cutting system to a discharge and there is provided a hydraulic motor for driving the crop conveying system and wherein there is provided a variable rate valve which varies the flow rate to the crop conveying system and wherein the second circuit is arranged to drive the crop conveying system in the reverse direction.

4. The machine according to claim 1 wherein the second circuit is arranged to drive the motors at a constant rate.

5. The machine according to claim 1 wherein the second circuit is arranged to drive the motors in series.

6. The machine according to claim 1 wherein the at least one pump includes a first pump and a second pump and the first circuit provides separate channels for supplying fluid from the first pump and the second pump to respective ones of the motors.

7. The machine according to claim 6 wherein the second circuit is arranged to drive the motors in reverse direction from only one of the pumps.

8. The machine according to claim 1 wherein first circuit is arranged such that said at least one of the pumps provides fluid to drive at least two of the motors in series.

9. The machine according to claim 8 wherein the first circuit is arranged such that the first variable rate valve controls a rate of flow of fluid to one motor which is arranged in series with a second motor and the second variable rate valve is arranged to supply additional fluid to the second motor.

10. The machine according to claim 1 wherein the first circuit is defined in at least one first circuit block and the second circuit is arranged separate from the first circuit in a separate block which can be removed separately from the first circuit such that the first circuit can be operated in the absence of the further block for driving only in the forward direction.

11. The machine according to claim 10 wherein the separate block includes a return conduit which supplies to the return drain of the first circuit.

12. The machine according to claim 1 wherein the first and second circuits are arranged to provide coupling ports for releasable connection to the header for replacement of the header.

* * * * *